US007844457B2

(12) United States Patent
Chen et al.

(10) Patent No.: US 7,844,457 B2
(45) Date of Patent: Nov. 30, 2010

(54) UNSUPERVISED LABELING OF SENTENCE LEVEL ACCENT

(75) Inventors: YiNing Chen, Beijing (CN); Frank Kao-ping Soong, Beijing (CN); Min Chu, Beijing (CN)

(73) Assignee: Microsoft Corporation, Redmond, WA (US)

( * ) Notice: Subject to any disclaimer, the term of this patent is extended or adjusted under 35 U.S.C. 154(b) by 954 days.

(21) Appl. No.: 11/708,442

(22) Filed: Feb. 20, 2007

(65) Prior Publication Data

US 2008/0201145 A1 Aug. 21, 2008

(51) Int. Cl.
*G10L 15/06* (2006.01)

(52) U.S. Cl. .......................... 704/244; 704/245; 704/9; 704/10; 704/E15.025; 704/E15.02

(58) Field of Classification Search .............. 704/9–10, 704/243–255, E15.02, E15.025
See application file for complete search history.

(56) References Cited

U.S. PATENT DOCUMENTS

| | | | | |
|---|---|---|---|---|
| 4,783,811 | A | 11/1988 | Fisher et al. | 381/52 |
| 4,797,930 | A | 1/1989 | Goudie | 381/52 |
| 4,908,867 | A | 3/1990 | Silverman | 381/51 |
| 5,212,731 | A | 5/1993 | Zimmermann | 381/52 |
| 5,845,047 | A | 12/1998 | Fukada et al. | 395/2.77 |
| 6,101,470 | A | 8/2000 | Eide et al. | 704/260 |
| 6,477,495 | B1 | 11/2002 | Nukaga et al. | 704/268 |
| 6,529,874 | B2 | 3/2003 | Kagoshima et al. | 704/269 |
| 7,136,816 | B1 * | 11/2006 | Strom | 704/260 |
| 2005/0075879 | A1 | 4/2005 | Anderton | 704/260 |
| 2005/0192807 | A1 * | 9/2005 | Emam et al. | 704/260 |
| 2007/0067173 | A1 * | 3/2007 | Bellegarda | 704/260 |
| 2008/0147404 | A1 * | 6/2008 | Liu et al. | 704/256.2 |

OTHER PUBLICATIONS

Bergem. "Acoustic Vowel Reduction as a Function of Sentence Accent, Word Stress, and Word Class" 1993.*

Conkie et al. "Prosody Recognition from Speech Utterances using Acoustic and Lingustic based Models of Prosodic Events" 1999.*

Ni et al. "An Unsupervised Approach to Automatic Prosodic Annotation" 2007.*

Chen et al. "Prosody Dependent Speech Recognition on Radio News Corpus of American English" Jan. 2006.*

Toutanova et al. "Extensions to HMM-based StatisticalWord Alignment Models" 2002.*

Wang et al. "An Unsupervised Quantitative Measure for Word Prominence in Spontaneous Speech" 2005.*

Hasegawa-Johnson et al. "Speech Recognition Models of the Interdependence Among Syntax, Prosody, and Segmental Acoustics" 2004.*

Ananthakrishnan et al. "Combining Acoustic, Lexical, and Syntactic Evidence for Automatic Unsupervised Prosody Labeling" Sep. 17-21, 2006.*

Shattuck-Hufnagel et al. "A Prosody Tutorial for Investigators of Auditory Sentence Processing" 1996.*

(Continued)

*Primary Examiner*—Talivaldis I Smits
*Assistant Examiner*—Greg A Borsetti
(74) *Attorney, Agent, or Firm*—Westman, Champlin & Kelly, P.A.

(57) ABSTRACT

Methods are disclosed for automatic accent labeling without manually labeled data. The methods are designed to exploit accent distribution between function and content words.

9 Claims, 9 Drawing Sheets

OTHER PUBLICATIONS

Chen et al. "An Automatic Prosody Labeling System Using Ann-Based Syntactic-Prosodic Model and GMM-Based Acoustic-Prosodic Model" 2004.*

Ananthakrishnan et al. "An Automatic Prosody Recognizer Using a Coupled Multi-Stream Acoustic Model and a Syntactic-Prosodic Language Model" 2005.*

Bulyko et al. "A Bootstrapping Approach to Automating Prosodic Annotation for Limited-Domain Synthesis" 2002.*

Levow. "Unsupervised Learning of Tone and Pitch Accent" May 2-5, 2006.*

Cutler et al. "On the Role of Sentence Stress in Sentence Processing" 1977.*

Chen et al. "Automatic Accent Annotation with Limited Manually Labeled Data" May 2-5, 2006.*

Batliner et al. "Automatic Annotation and Classification of Phrase Accents to Spontaneous Speech" 1999.*

Tur et al. "Semi-Supervised Learning for Spoken Language Understanding Using Semantic Role Labeling" 2005.*

Imoto et al. "Modeling and Automatic Detection of English Sentence Stress for Computer-Assisted English Prosody Learning System" 2002.*

Tur et al. "Combining active and semi-supervised learning for spoken language understanding" 2004.*

Tur et al. "Exploiting Unlabeled Utterances for Spoken Language Understanding" 2003.*

Tur et al. "An Active Approach to Spoken Language Processing" Oct. 2006.*

Buckow et al. "Detection of Prosodic Events Using Acoustic-Prosodic Features and Part-of-Speech Tags" 2000.*

Liang. "Semi-Supervised Learning for Natural Language" May 19, 2005.*

Levow. "Unsupervised and Semi-supervised Learning of Tone and Pitch Accent" Jun. 2006.*

Syrdal & Hirschberg, A. & J.; Automatic ToBI Prediction and Alignment to Speed Manual Labeling of Prosody. www.research.att.com/~ttsweb/tts/papers/2000_SpeechCom/spcom.ps, pp. 1-30, 2001.

Zervas, P. et al.; Evaluation of Corpus Based Tone Prediction in Mismatched Environments for Greek TtS Synthesis, Proc. 8th Int. Conf. On Spoken Language Processing, Jeju, Korea, Oct. 4-8, 2004, pp. 761-764.

Wightman, C. et al.; Perceptually Based Automatic Prosody Labeling and Prosodically Enriched Unit Selection Improve Concatenative Text-To-Speech Synthesis, www.research.att.com/~ttsweb/tts/papers/2000_ICSLP/tobiLite.ps, 4 pgs., Oct. 2000.

* cited by examiner

UNSUPERVISED LABELING OF SENTENCE LEVEL ACCENT

BACKGROUND

Prosody labeling is an important part of many speech synthesis and speech understanding processes and systems. Among all prosody events, accent is often of particular importance. Manual accent labeling, for its own sake or to support an automatic labeling technique, is often expensive, time consuming, and can be error prone given inconsistency between labelers. As a result, auto-labeling is often a more desirable alternative.

Currently, there are some known methods that, to some extent, support accent auto-labeling. However, it is common that all or a portion of the classifiers used for labeling accented/unaccented syllables are trained from manually labeled data. Due to circumstances such as the cost of labeling, the size of manually labeled data is often not large enough to train classifiers with a high degree of precision. Moreover, it is not necessarily easy to find individuals qualified to the labeling in an efficient and effective manner.

The discussion above is merely provided for general background information and is not intended to be used as an aid in determining the scope of the claimed subject matter.

SUMMARY

Methods are disclosed for automatic accent labeling without manually labeled data. The methods are designed to exploit accent distribution between function and content words.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

Figure 1A:
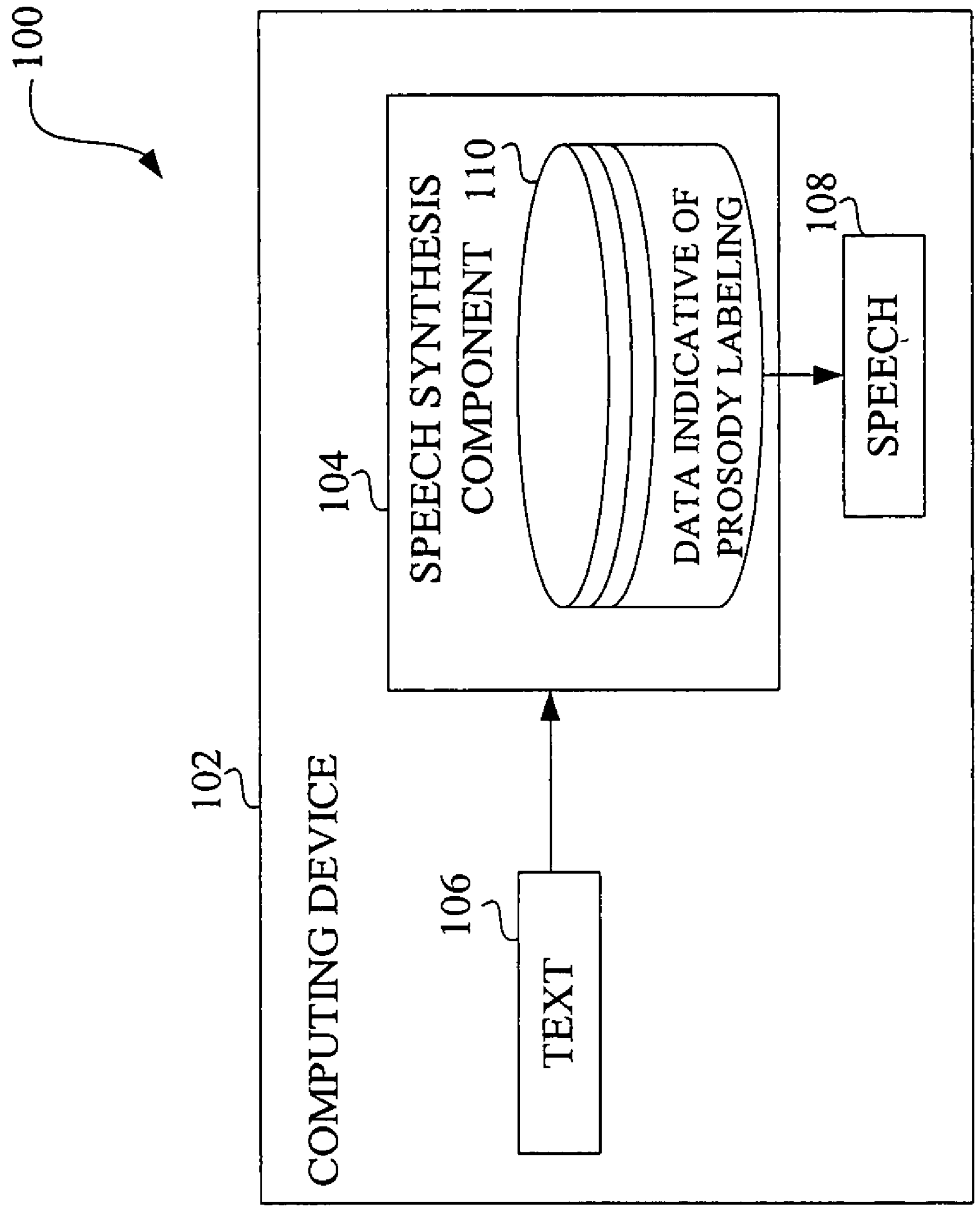
FIGS. 1A and 1B illustrate examples of suitable speech processing environments in which embodiments may be implemented.

Those skilled in the art will appreciate that prosody labeling can be important in a variety of different environments. As one example, FIG. 1A is a schematic diagram of a speech synthesis system 100. System 100 includes a speech synthesis component 104 that is illustratively a collection of software that is operatively installed on a computing device 102. As is shown, component 104 is configured to receive a collection of text 106, process it, and produce a corresponding collection of speech 108. To support the generation of speech 108, component 104 illustratively applies information included in database 110, which is data that reflects the results of a prosody labeling process. In one embodiment, data 110 provides assumptions related to accent that are applied as part of the generation of speech 108 based on text 106.

To the extent that embodiments are described herein in the context of text-to-speech (TTS) systems, it is to be understood that the scope of the present invention is not so limited. Without departing from the scope of the present invention, the same or concepts could just as easily be applied in other speech processing environments. The example of a TTS system is provided only for the purpose of illustration because, as it happens, to synthesize natural speech in many TTS systems (e.g., concatenation- or HMM-based systems), it is often desirable to have a training database size wherein relevant tags are labeled with high quality.

Figure 1B:
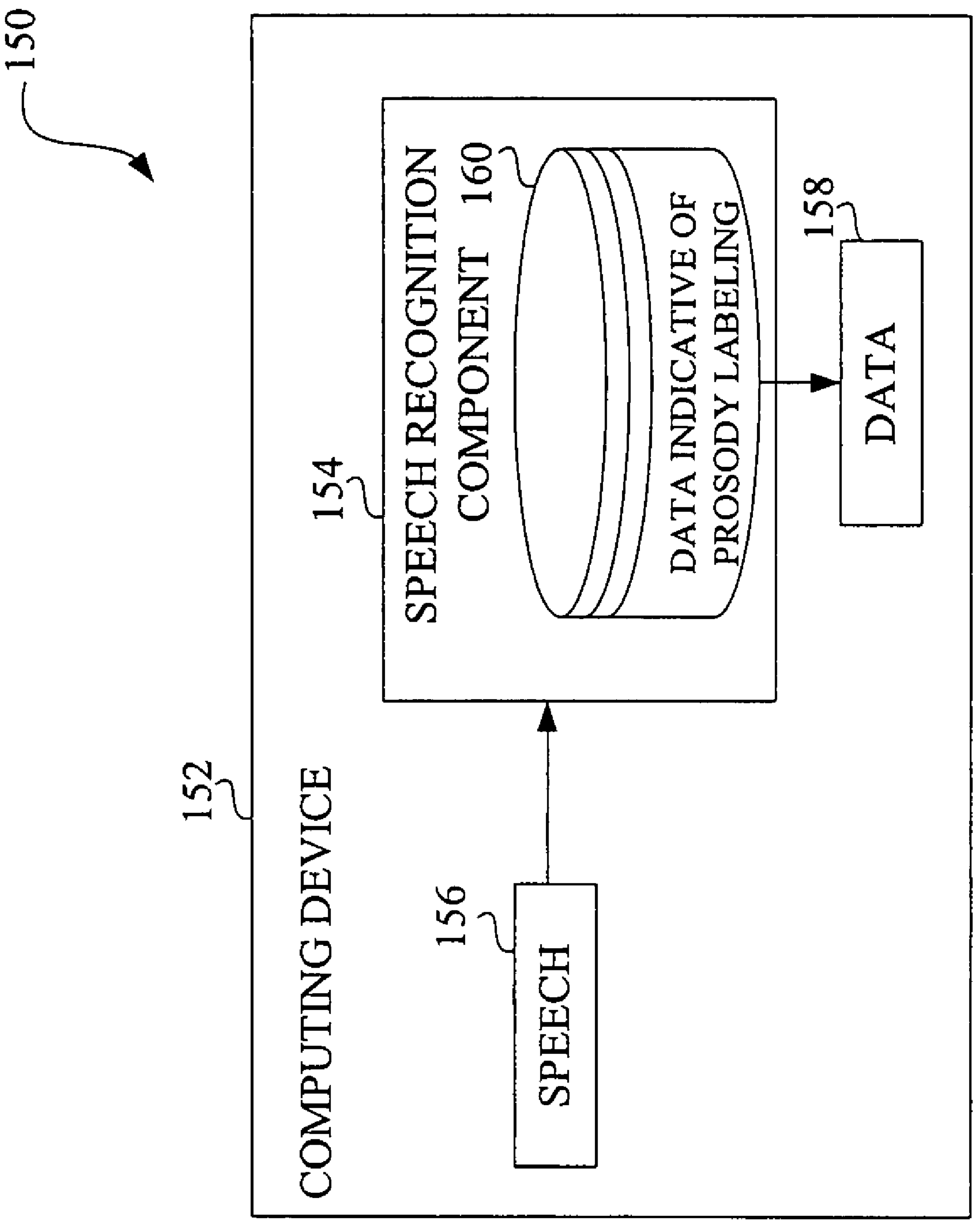

FIG. 1B provides another example of a suitable processing environment. FIG. 1B is a schematic diagram of a speech recognition system 150. System 150 includes a speech recognition component 154 that is illustratively a collection of software that is operatively installed on a computing device 152. As is shown, component 154 is configured to receive a collection of speech 156, process it, and produce a corresponding collection of data 158 (e.g., text). Data 158 could be, but isn't necessarily, text that corresponds to speech 156. To support the generation of data 158, component 154 illustratively applies information included in database 160, which is data that reflects the results of a prosody labeling process. In one embodiment, data 160 provides assumptions related to accent that are applied as part of the generation of data 158 based on speech 156.

FIGS. 1A and 1B illustrate examples of suitable processing environments in which embodiments may be implemented. Systems 100 and 150 are only examples of suitable environments and are not intended to suggest any limitation as to the scope of use or functionality of the claimed subject matter. Neither should the environments be interpreted as having any dependency or requirement relating to any one or combination of illustrated components. Finally, it should be noted that examples of appropriate computing system environments (e.g., devices 102 and 150) are provided herein in relation to FIG. 7.

When prosody labeling is conducted (e.g., in support of data sets 110 and 160), a characteristic that is commonly labeled is accent. For example, in a common scenario, if a given word is accented, then the vowel in the stressed syllable is accented while other vowels are unaccented. If a word is unaccented, then all vowels in it of unaccented. The manual labeling of accent is typically slow and relatively expensive. As a result, auto-labeling is often a more desirable alternative. However, many auto-labeling systems require at least some manual labels in order to train an initial model or classifier. Thus, there is a need for systems and methods that support effective automatic accent labeling without reliance on manually labeled data.

There is a correlation between part-of-speech (POS) and the acoustic behavior of word accent. Usually, content words, which generally carry more semantic weight in a sentence, are accented while function words are unaccented. Based on this correlation, content words can be labeled as accented and, as it happens, the accuracy of acting on the assumption is relatively high. Unfortunately, the accuracy of labeling all function words as unaccented does not turn out to be as high.

In one embodiment, in order to remedy this situation, content words are used as a training set for the labeling of function words. The accented vowels in the content words and the unaccented vowels in the labeled function words are then illustratively utilized to build robust models. In one embodiment, with one or more of these models as the seed, an iteration method is applied to enhance the accuracy of function word accent labeling, thereby enabling an even more refined model.

Figure 2:
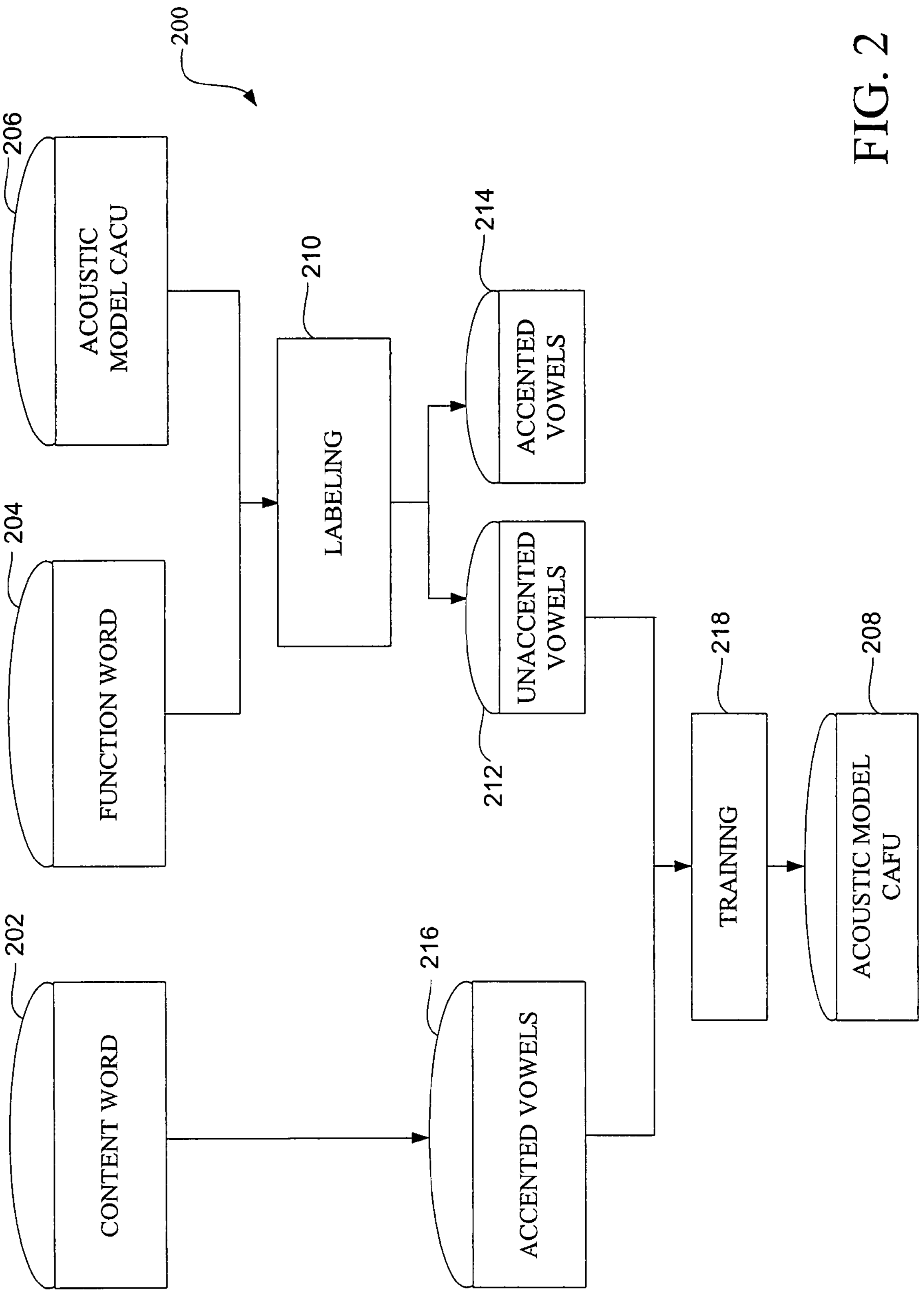
FIG. 2 is a schematic illustration of a model training process.

FIG. 2 is a schematic illustration of a model training process as described. At the beginning of the process, which is identified as process 200, there is no manually labeled accent data. Thus, there is a need for some data upon which to build an initial model. A first step in generating such data begins with classification of each word in a data set (e.g., a collection of sentences) as being either a content word or a function word. Within FIG. 2, word collection 202 represents content words and word collection 204 represents function words. In one embodiment, a part-of-speech (POS) classifier is utilized to facilitate the classification process. For example, in one embodiment, nouns, verbs, adjectives, and adverbs are classified as content words while other words are classified as function words.

Studies show that content words, which carry significant information, are very likely to be accented. Thus, categorically classifying content words as accented is a relatively accurate assumption as compared to human generated labels. The focus of the analysis can therefore be placed primarily on the function words.

In a dictionary, every word has stress labels. In an accented word, the vowel in the stressed syllable is accented and other vowels are unaccented. With the accented and unaccented vowels in content words, an initial model is illustratively built. This initial model is a CACU (Content-word Accented vowel and Content-word Unaccented vowel) acoustic model 206.

As is generally indicated by box 210, the CACU model 206 is utilized to label function words. 204, thereby producing a set of unaccented vowels 212 and accented vowels 214. In one embodiment, not by limitation, this labeling process is a Hidden Markov Model (HMM) labeling process. As is generally indicated by training step 218, the vowels 212 in function words with unaccented labels marked by CACU model 206 are used as a training set together with accented vowels 216 in content words in order to train a CAFU (Content-word Accented vowel and Function-word Unaccented vowel) model 208. In one embodiment, not by limitation, training step 128 is training of an HMM training classifier.

In one embodiment, the training procedure shown in FIG. 2 is repeated but this time replacing the CACU model 206 with the generated CAFU model 208. In other words, the process can be iterated one or more times by using CAFU model 208 from the previous iteration to label function words. Repeating the process in this way results in a refined CAFU model 208 that is generally more effective than that associated with the previous iteration. Of course, the benefits to the CAFU model 208 may decrease from one iteration to the next. In one embodiment, the iteration process is stopped when the output CAFU model 208 reaches a predetermined or desirable degree of refinement.

Figure 3:
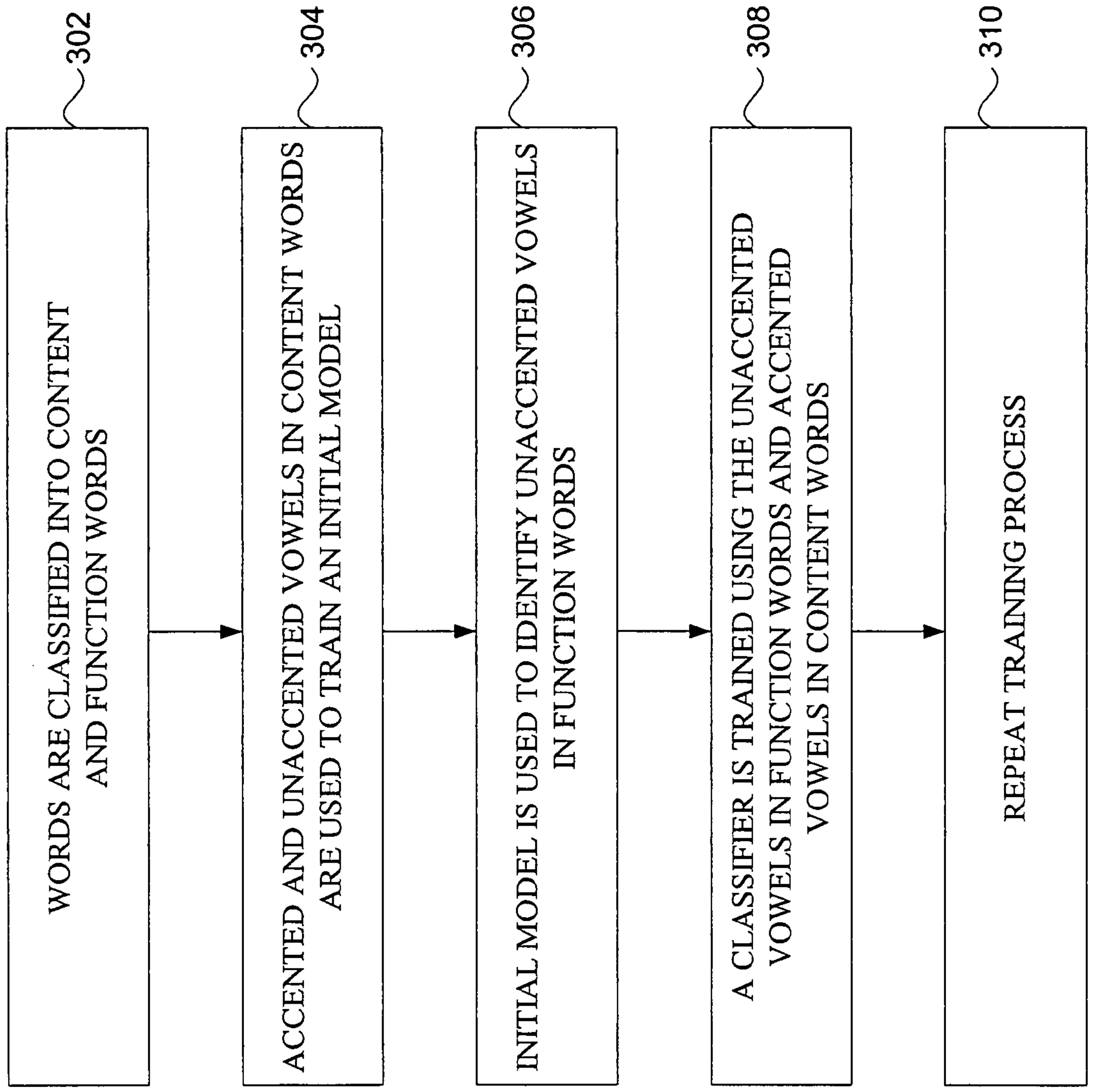
FIG. 3 is a flow chart diagram demonstrating steps associated with a model training process.

FIG. 3 is a flow chart diagram demonstrating, on a high level, steps associated with process 200. In accordance with step 302, words in a data set are classified as being either content words or function words. Based on the relationship between function words and content words, it is assumed that an effective classifier can be built by using accented vowels in content words and unaccented vowels in function words. Further, it is also known that, because most function words are unaccented, unaccented vowels in function words can be obtained in with rather high accuracy.

In accordance with block 304, accented and unaccented vowels in content words are used to train an initial model. In accordance with block 306, the initial model is used as a basis for identifying unaccented vowels in function words. In accordance with step 308, a new classifier is trained using the unaccented vowels in function words and accented vowels in content words. In accordance with block 310, which is illustratively an optional step, the training process is repeated. In one embodiment, each time the process is repeated, only the unaccented labels output by the classifiers are used to train a new classifier. In one embodiment, when the process is repeated, the classifier trained in step 308 is utilized in place of the initial model in step 306.

As has been described, certain embodiments of the present invention incorporate application of an acoustic classifier. In one embodiment, certainly not by limitation, the acoustic classifier utilized is a Hidden Markov Model (HMM) based acoustic classifier. In a conventional speech recognizer, for each English vowel, a universal HMM is used to model both accented and unaccented realizations. In one embodiment, not by limitation, in the context of the embodiments of the present invention, the accented (A) and unaccented (U) versions of the same vowel are trained separately as two different phones. In one embodiment, for the consonant, there is only one version (C) for each individual one.

In one embodiment, certainly not by limitation, function words, as that term is utilized in the present description, refers to words with little inherent meaning but with important roles in the grammar of a language. Non-function words are referred to as content words. Typically, but not by limitation, content words are nouns, verbs, adjectives and adverbs. In light of the difference between content words and function words, accented and unaccented vowels can illustratively be split into accented function words ($A_F$), unaccented function words ($U_F$), accented content words ($A_C$), and unaccented content words ($U_C$). In one embodiment, certainly not by limitation, classification is based upon the assumption that there are 64 different vowels and 22 different consonants. In the context of embodiments of auto-labeling described herein, a tri-phone model is illustratively utilized based on this phone set. However, those skilled in the art will appreciate that the classifiers and classifier characteristics described herein are examples only and that the auto-labeling embodiments described herein are not dependent upon any particular described classifier or classifier characteristic. Modifications and substitutions can be made without departing from the scope of the present invention.

In one embodiment, also not by limitation, certain assumptions are made in terms of the training of an HMM incorporated into embodiments of the present invention. For example, linguistic studies show that all syllables but one in a word tend to be unaccented in continuously spoken sentences. Thus, in one embodiment, the maximum number of accented syllables is constrained to one per word. In an accented word, the vowel in the primary stressed syllable is accented and the other vowels are unaccented. In an unaccented word, all vowels are unaccented.

Figure 4:
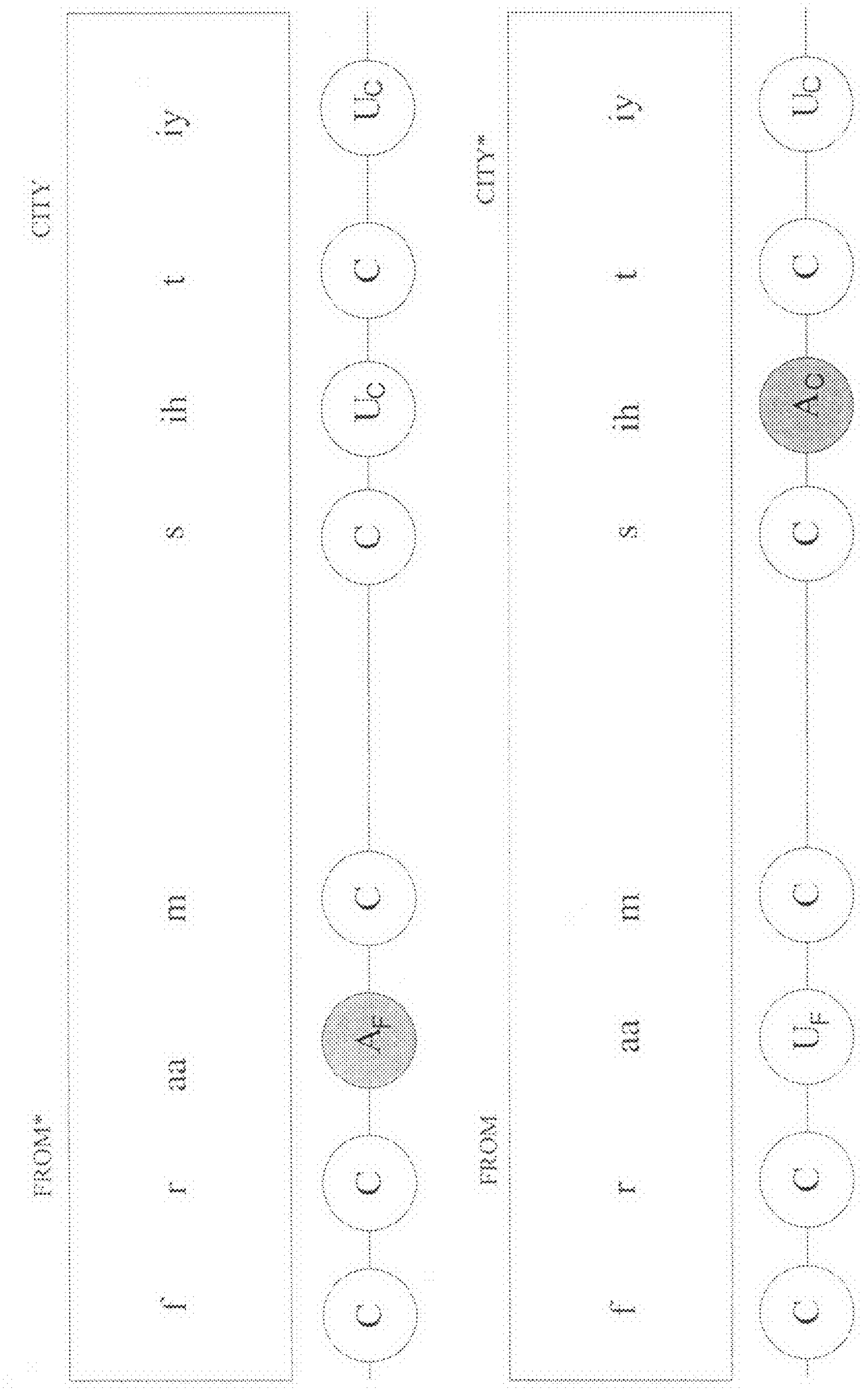
FIG. 4 is a schematic illustration demonstrating accented and unaccented versions of a pronunciation lexicon.

In one embodiment, also not by limitation, before HMM training, the pronunciation lexicon is adjusted in terms of the phone set. Each word pronunciation is encoded into both accented and unaccented versions. FIG. 4 is a schematic illustration demonstrating accented and unaccented versions of a pronunciation lexicon. The phonetic transcription of the accented version of a word is used if it is accented. Otherwise, the unaccented version is used. In one embodiment, not by limitation, HMMs are trained with a standard Baum-Welch algorithm using the known HTK software package. The trained acoustic model is used to label accent.

Figure 5:
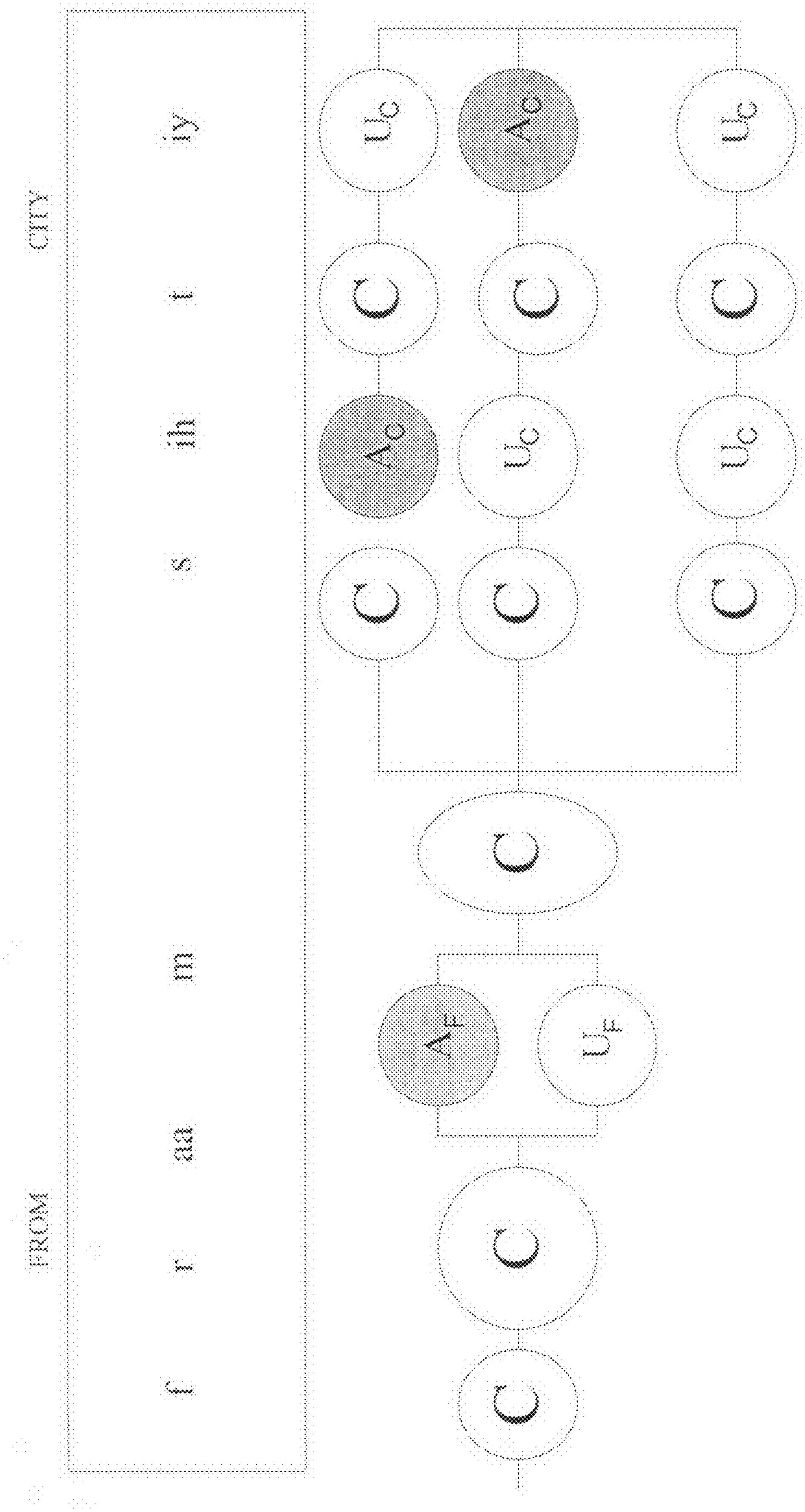
FIG. 5 is a schematic representation of a decoding process in a finite state network.

In one embodiment, not by limitation, accent labeling is illustratively a decoding process in a finite state network. FIG. 5 is a schematic representation of such a scenario. Multiple pronunciations are generated for each word in a given utterance. For monosyllabic words (e.g., the word "from" in FIG. 2), the vowel has two nodes, an "A" node (stands for the accented vowel) and a "U" node (stands for the unaccented vowel). For multi-syllabic words, parallel paths are provided, wherein each path has at most one "A" node (e.g., the word "city" in FIG. 2). After maximum likelihood search based decoding, words aligned with an accented vowel are labeled as accented and other as unaccented.

Those skilled in the art will appreciate that the scope of the present invention also includes other methods for leveraging the relationship between function and content words (e.g., the relationship between function and content version of vowels) as a basis for automatic accent labeling. FIGS. 6A-6D are schematic representations of four different methods that can be utilized for accent labeling. As is shown, in the decoding portion of the automatic labeling processes described herein, each function word can be decoded in accordance with at least four different models.

Figure 6A:
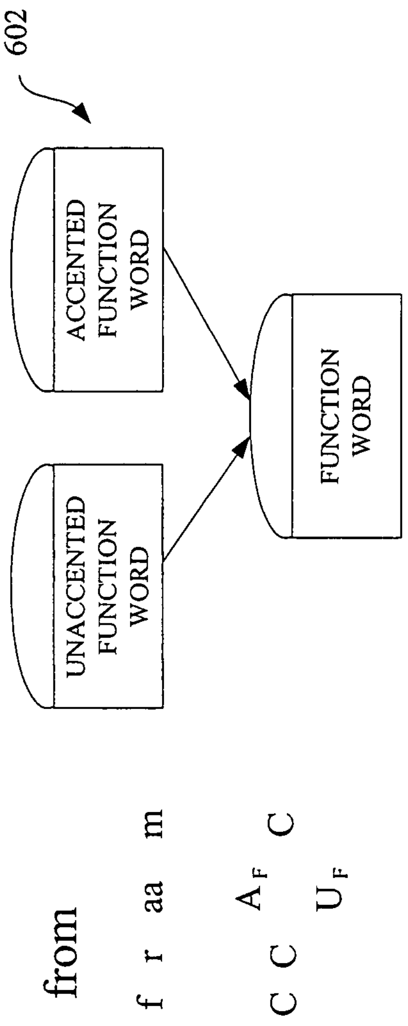
FIG. 6A-6D are schematic representations showing decoding in accordance with various models.
Figure 6B:
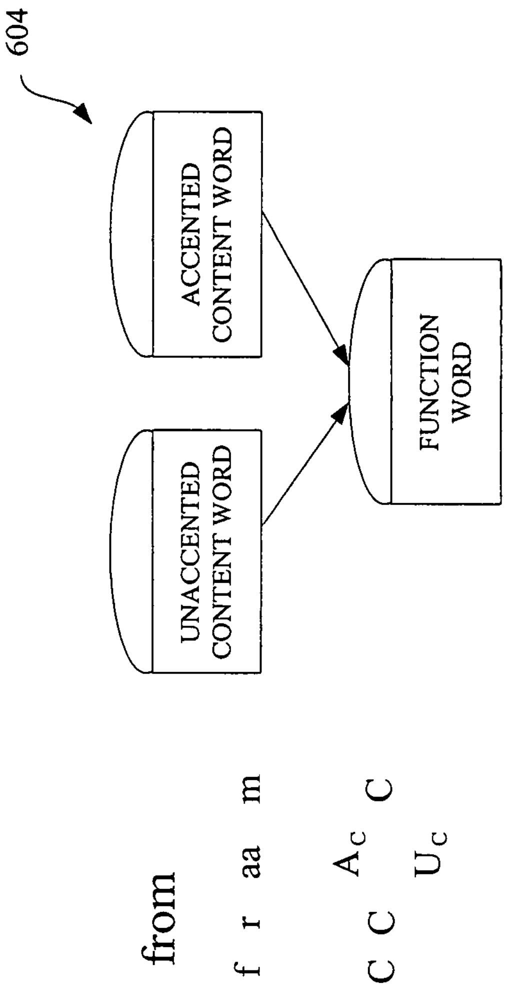
Figure 6C:
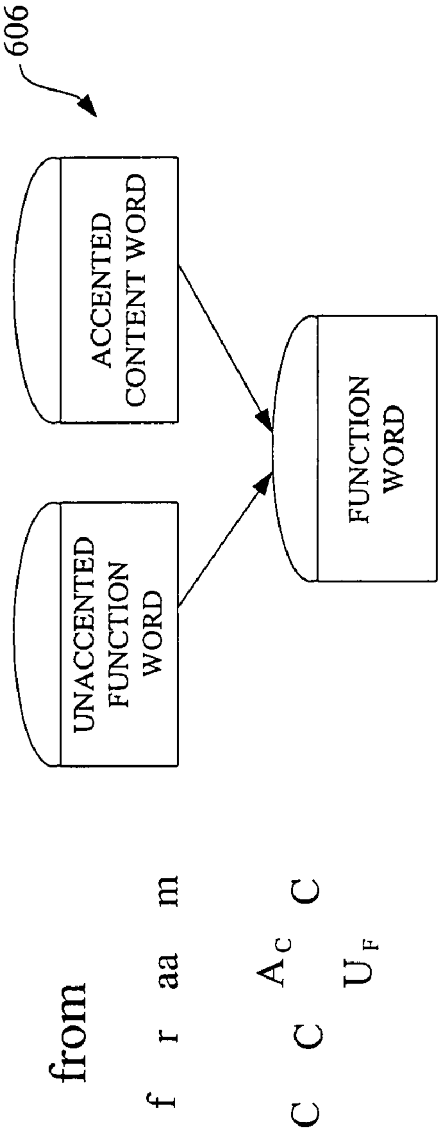
Figure 6D:
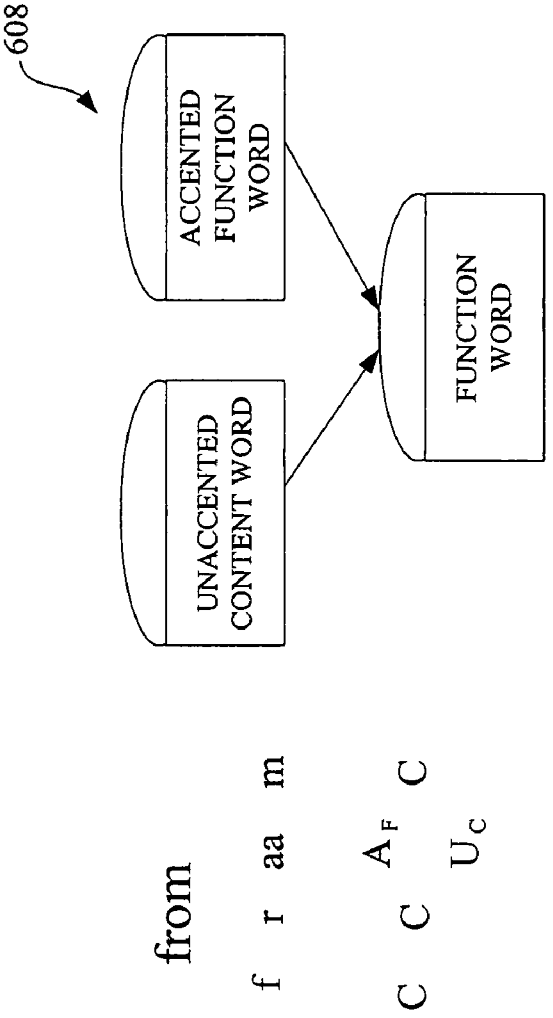

FIG. 6A shows decoding in accordance with a model 602, which incorporates an $A_F$ node and a $U_F$ node. FIG. 6B shows decoding in accordance with a model 604, which incorporates an $A_C$ node and a $U_C$ node. FIG. 6C shows decoding in accordance with a model 606, which incorporates an $A_C$ node and a $U_F$ node. Finally, FIG. 6D shows decoding in accordance with a model 608, which incorporates an $A_F$ node and a $U_C$ node.

In accordance with the four different models, four different acoustic classifiers can be obtained. Each classifier illustratively leads to a different level of accuracy. The error rate associated with model 602 is the best because function words are labeled by its own acoustic model. In contrast, for model 604, function words are labeled by an acoustic model of content words, thus leading to a higher error rate. The assumption is that the acoustic model of function words and content words are not the same. For model 606, the accent in content words and unaccented vowels in function words can be utilized to build a relatively robust model, with an error rate possibly similar to that associated with model 602. The error rate associated with model 608 is likely to be relatively high. In general, the accent model in content words and unaccented model in function words is likely to be relatively robust, and the model is a good candidate for use for other parts-of-speech.

These observations are useful. In unsupervised conditions, obtaining relatively accurate training data is an important issue. If it is assumed that all content words are correctly labeled, the training set of Ac can be obtained. In function words, a relatively small percentage are accented (e.g., 15%). Hence, it is not easy ot get enough correct data of accented vowels. However, it is easier to get enough unaccented vowels.

Model 604 is trained based on content words only, so it can be viewed as a start up model. The accuracy of detecting unaccented labels by model 604 is relatively high (e.g., 95%). Thus, the accuracy of unaccented labels is trustworthy. Thus, the training set of unaccented vowels in function words ($U_F$) can be obtained.

Figure 7:
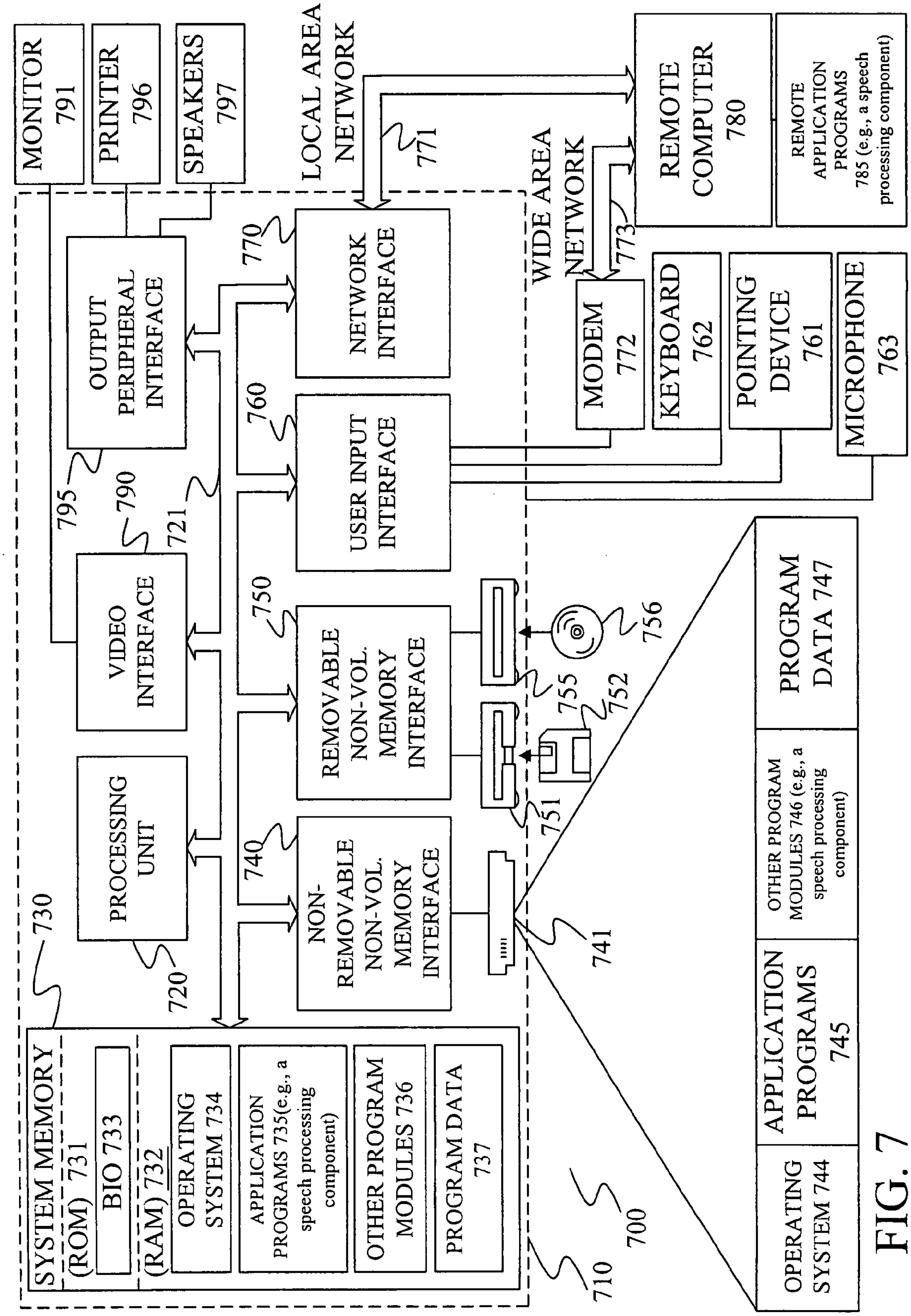
FIG. 7 illustrates an example of a suitable computing system environment in which embodiments may be implemented.

FIG. 7 illustrates an example of a suitable computing system environment 700 in which embodiments may be implemented. The computing system environment 700 is only one example of a suitable computing environment and is not intended to suggest any limitation as to the scope of use or functionality of the claimed subject matter. Neither should the computing environment 700 be interpreted as having any dependency or requirement relating to any one or combination of components illustrated in the exemplary operating environment 700.

Embodiments are operational with numerous other general purpose or special purpose computing system environments or configurations. Examples of well-known computing systems, environments, and/or configurations that may be suitable for use with various embodiments include, but are not limited to, personal computers, server computers, hand-held or laptop devices, multiprocessor systems, microprocessor-based systems, set top boxes, programmable consumer electronics, network PCs, minicomputers, mainframe computers, telephony systems, distributed computing environments that include any of the above systems or devices, and the like.

Embodiments may be described in the general context of computer-executable instructions, such as program modules, being executed by a computer. Generally, program modules include routines, programs, objects, components, data structures, etc. that perform particular tasks or implement particular abstract data types. Some embodiments are designed to be practiced in distributed computing environments where tasks are performed by remote processing devices that are linked through a communications network. In a distributed computing environment, program modules are located in both local and remote computer storage media including memory storage devices.

With reference to FIG. 7, an exemplary system for implementing some embodiments includes a general-purpose computing device in the form of a computer 710. Components of computer 710 may include, but are not limited to, a processing unit 720, a system memory 730, and a system bus 721 that couples various system components including the system memory to the processing unit 720. The system bus 721 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 710 typically includes a variety of computer readable media. Computer readable media can be any available media that can be accessed by computer 710 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 710. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 730 includes computer storage media in the form of volatile and/or nonvolatile memory such as read only memory (ROM) 731 and random access memory (RAM) 732. A basic input/output system 733 (BIOS), containing the basic routines that help to transfer information between elements within computer 710, such as during start-up, is typically stored in ROM 731. RAM 732 typically contains data and/or program modules that are immediately accessible to and/or presently being operated on by processing unit 720. By way of example, and not limitation, FIG. 7 illustrates operating system 734, application programs 735, other program modules 736, and program data 737. As is indicated, programs 735 may include a speech processing component incorporating components that reflect embodiments of the present invention (e.g., but not limited to, speech processing component 104 and/or component 154 as described above in relation to FIG. 1). This need not necessarily be the case.

The computer 710 may also include other removable/non-removable volatile/nonvolatile computer storage media. By way of example only, FIG. 7 illustrates a hard disk drive 741 that reads from or writes to non-removable, nonvolatile magnetic media, a magnetic disk drive 751 that reads from or writes to a removable, nonvolatile magnetic disk 752, and an optical disk drive 755 that reads from or writes to a removable, nonvolatile optical disk 756 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 741 is typically connected to the system bus 721 through a non-removable memory interface such as interface 740, and magnetic disk drive 751 and optical disk drive 755 are typically connected to the system bus 721 by a removable memory interface, such as interface 750.

The drives, and their associated computer storage media discussed above and illustrated in FIG. 7, provide storage of computer readable instructions, data structures, program modules and other data for the computer 710. In FIG. 7, for example, hard disk drive 741 is illustrated as storing operating system 744, application programs 745, other program modules 746, and program data 747. Note that these components can either be the same as or different from operating system 734, application programs 735, other program modules 736, and program data 737. Operating system 744, application programs 745, other program modules 746, and program data 747 are given different numbers here to illustrate that, at a minimum, they are different copies. As is indicated, programs 746 may include a speech processing component incorporating components that reflect embodiments of the present invention (e.g., but not limited to, speech processing component 104 and/or component 154 as described above in relation to FIG. 1). This need not necessarily be the case.

A user may enter commands and information into the computer 710 through input devices such as a keyboard 762, a microphone 763, and a pointing device 761, such as a mouse, trackball or touch pad. Other input devices (not shown) may include a joystick, game pad, satellite dish, scanner, or the like. These and other input devices are often connected to the processing unit 720 through a user input interface 760 that is coupled to the system bus, but may be connected by other interface and bus structures, such as a parallel port, game port or a universal serial bus (USB). A monitor 791 or other type of display device is also connected to the system bus 721 via an interface, such as a video interface 790. In addition to the monitor, computers may also include other peripheral output devices such as speakers 797 and printer 796, which may be connected through an output peripheral interface 795.

The computer 710 is operated in a networked environment using logical connections to one or more remote computers, such as a remote computer 780. The remote computer 780 may be a personal computer, a hand-held device, a server, a router, a network PC, a peer device or other common network node, and typically includes many or all of the elements described above relative to the computer 710. The logical connections depicted in FIG. 7 include a local area network (LAN) 771 and a wide area network (WAN) 773, but may also include other networks. Such networking environments are commonplace in offices, enterprise-wide computer networks, intranets and the Internet.

When used in a LAN networking environment, the computer 710 is connected to the LAN 771 through a network interface or adapter 770. When used in a WAN networking environment, the computer 710 typically includes a modem 772 or other means for establishing communications over the WAN 773, such as the Internet. The modem 772, which may be internal or external, may be connected to the system bus 721 via the user input interface 760, or other appropriate mechanism. In a networked environment, program modules depicted relative to the computer 710, or portions thereof, may be stored in the remote memory storage device. By way of example, and not limitation, FIG. 7 illustrates remote application programs 785 as residing on remote computer 780. It will be appreciated that the network connections shown are exemplary and other means of establishing a communications link between the computers may be used. As is indicated, programs 785 may include a speech processing component incorporating components that reflect embodiments of the present invention (e.g., but not limited to, speech processing component 104 and/or component 154 as described above in relation to FIG. 1). This need not necessarily be the case. In one embodiment, a speech processing component that incorporates component that reflect embodiments of the present invention is otherwise implemented, for example, but not limited to, implementation as part of operating system 534.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer-implemented method of training an acoustic model, the method comprising:

classifying each of a plurality of words as being either a content word or a function word;

utilizing a characteristic of at least one of the content words as a basis for identifying an accent characteristic of at least one of the function words;

utilizing a computer processor that is a functional component of a computer to train the acoustic model with a collection of data so as to be indicative of the accent characteristic of the at least one of the function words, to be indicative of accented vowels of words that have been classified as being content words, and to be indicative of unaccented vowels of words that have been classified as being function words; and wherein accented vowels of words that have been labeled as function words are excluded from the collection of data utilized to train the acoustic model.

2. The method of claim 1, wherein training the acoustic model comprises training so as to add an indication of an unaccented vowel of a word that has been classified as a function word.

3. The method of claim 2, further comprising training the acoustic model so as to add an indication of an accented vowel of a word that has been classified as a content word.

4. The method of claim 1, further comprising utilizing the characteristic as a basis for labeling an accent characteristic of at least one of the function words.

5. The method of claim 1, wherein utilizing a characteristic of at least one of the content words as a basis for identifying an accent characteristic of at least one of the function words comprises utilizing accented and unaccented vowels.

6. The method of claim 1, further comprising utilizing the acoustic model as a basis for labeling the function word.

7. A computer-implemented method of training an acoustic model, the method comprising:

utilizing a computer processor that is a functional component of a computer and a first acoustic model to label accented and unaccented components of function words;

utilizing the unaccented components of the function words as a basis for training a second acoustic model; and excluding the accented components of the function words from a collective set of data utilized as a basis for training the second acoustic model.

8. The method of claim 7, wherein the first acoustic model contains a representation of accented and unaccented components of words that have been identified as being content words.

9. The method of claim 7, further comprising utilizing the second acoustic model as a basis for labeling accented and unaccented components of words that have been identified as being function words.

* * * * *